Dec. 22, 1953  C. C. FUERST  2,663,235
HIGH-SPEED SHUTTER
Filed Oct. 7, 1950  5 Sheets-Sheet 1

CARL C. FUERST
Inventor

Daniel J. Mayne,
Donald H. Stewart
By
Attorneys

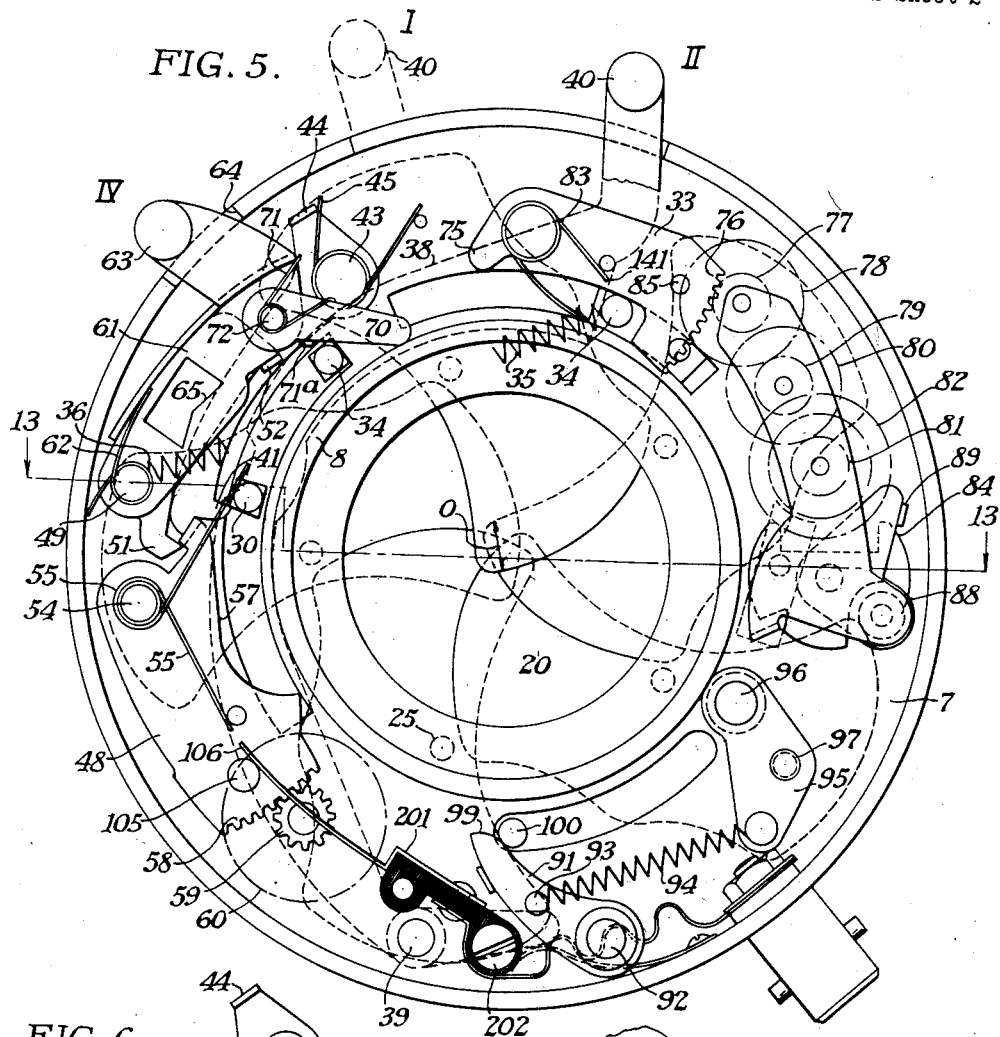

Dec. 22, 1953   C. C. FUERST   2,663,235
HIGH-SPEED SHUTTER
Filed Oct. 7, 1950   5 Sheets-Sheet 3

CARL C. FUERST
Inventor

By Daniel J. Mayne
Donald H. Stewart
Attorneys

Dec. 22, 1953  C. C. FUERST  2,663,235
HIGH-SPEED SHUTTER
Filed Oct. 7, 1950  5 Sheets-Sheet 4

CARL C. FUERST
Inventor

By Daniel J. Mayne
Donald H. Stewart
Attorneys

Dec. 22, 1953     C. C. FUERST     2,663,235
HIGH-SPEED SHUTTER
Filed Oct. 7, 1950     5 Sheets—Sheet 5
FIG. 14.
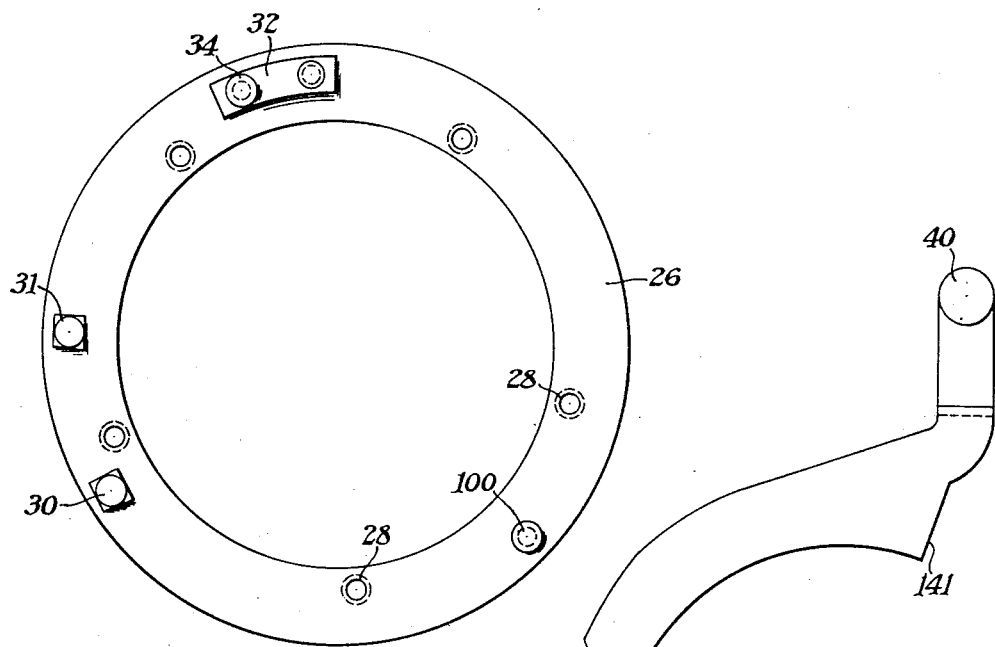
FIG. 16.
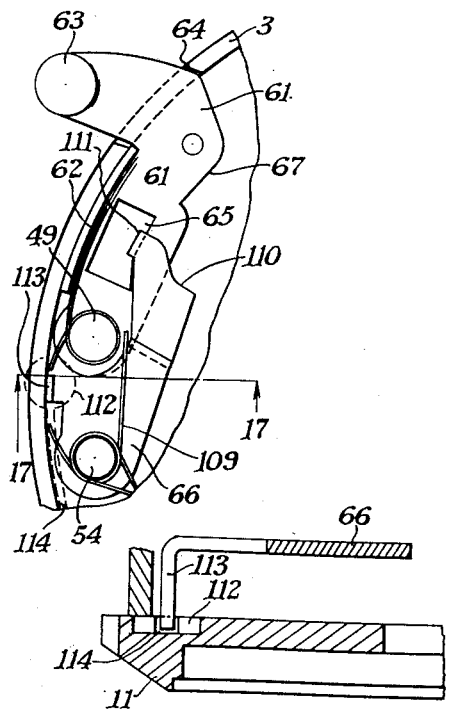
FIG. 15.
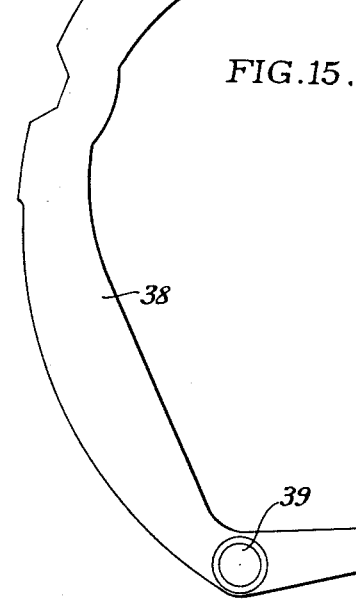
FIG. 17.
CARL C. FUERST
Inventor
Daniel J. Mayne.
By Donald H. Stewart,
Attorneys Patented Dec. 22, 1953

2,663,235

UNITED STATES PATENT OFFICE 2,663,235

HIGH-SPEED SHUTTER

Carl C. Fuerst, Rochester, N. Y., assignor to Eastman Kodak Company, Rochester, N. Y., a corporation of New Jersey Application October 7, 1950, Serial No. 189,031

11 Claims. (Cl. 95—63)

This invention relates to camera shutters of the symmetrical opening type. One object of my invention is to provide a camera shutter capable of extremely high speeds, and capable of accurately timed high and retarded speeds. Another object is to provide a shutter blade-driving structure in which the shutter blades are driven at a high speed in opening and closing. A still further object is to provide a shutter blade-driving mechanism in which movement of the shutter blades includes considerable overlap, particularly after exposures are made. Another object of my invention is to decelerate the movement of the shutter blades after the exposure is substantially completed and as the overlap in the shutter blades occurs after exposure. Still another object is to provide a shutter mechanism of the type including a power-operated shutter release adapted to trip the shutter in moving in one direction, and to decelerate the shutter blade-operating mechanism after tripping and after the exposure is completed. A still further object of my invention is to provide a shutter with a means for automatically setting the power-operated, shutter-tripping device at each shutter actuation. Other objects will appear from the following specification, the novel features being particularly pointed out in the claims at the end thereof.

High-speed shutters have been limited in their higher speeds, largely by the fact that shutter blades, moving at high speeds are difficult to start and stop in the small space that is afforded by shutter casings. If the shutter blades are turning about pivots rapidly, they can not be brought to rest instantly, as by striking an abutment without damaging the blades, pivots, or driving pins. This is particularly true where light-weight blades of, say, one to two-thousandths of an inch in thickness are used. Such blades must be capable of making many thousands of exposures.

By providing an improved blade-driving and stopping structure, I am able to provide a shutter mechanism capable of making extremely rapid exposures of from 1/1000, or 1/1200, of a second with a shutter having an exposure aperture of .705". Smaller aperture shutters could undoubtedly be made with still higher speeds, and larger apertures would be somewhat slower. The shutter is of the type in which blades move in only one direction in making an exposure, and in a reverse direction in setting. Supplemental blades are used to normally cover the exposure aperture being moved therefrom only when the shutter trigger is operated. In fast and slow exposures alike, the blades move at high speed in starting and stopping.

Coming now to the drawings in which like reference characters denote like parts throughout:

Fig. 5 is a top plan view of the shutter mechanism shown in Fig. 1, but with the parts in the position they assume as the shutter is about to be released to make an exposure;

Fig. 6 is a fragmentary top plan view of the sub-trigger, the releasing latch element and a portion of the power-operated shutter release. The parts are shown in a shutter-latching position to which they move after the shutter is set;

Fig. 7 is a view similar to Fig. 6, but with the sub-trigger moved to a position to release the power-operated shutter release which in this view is shown to have moved the latch member to a position from which slight further movement will trip the shutter;

Figure 1:
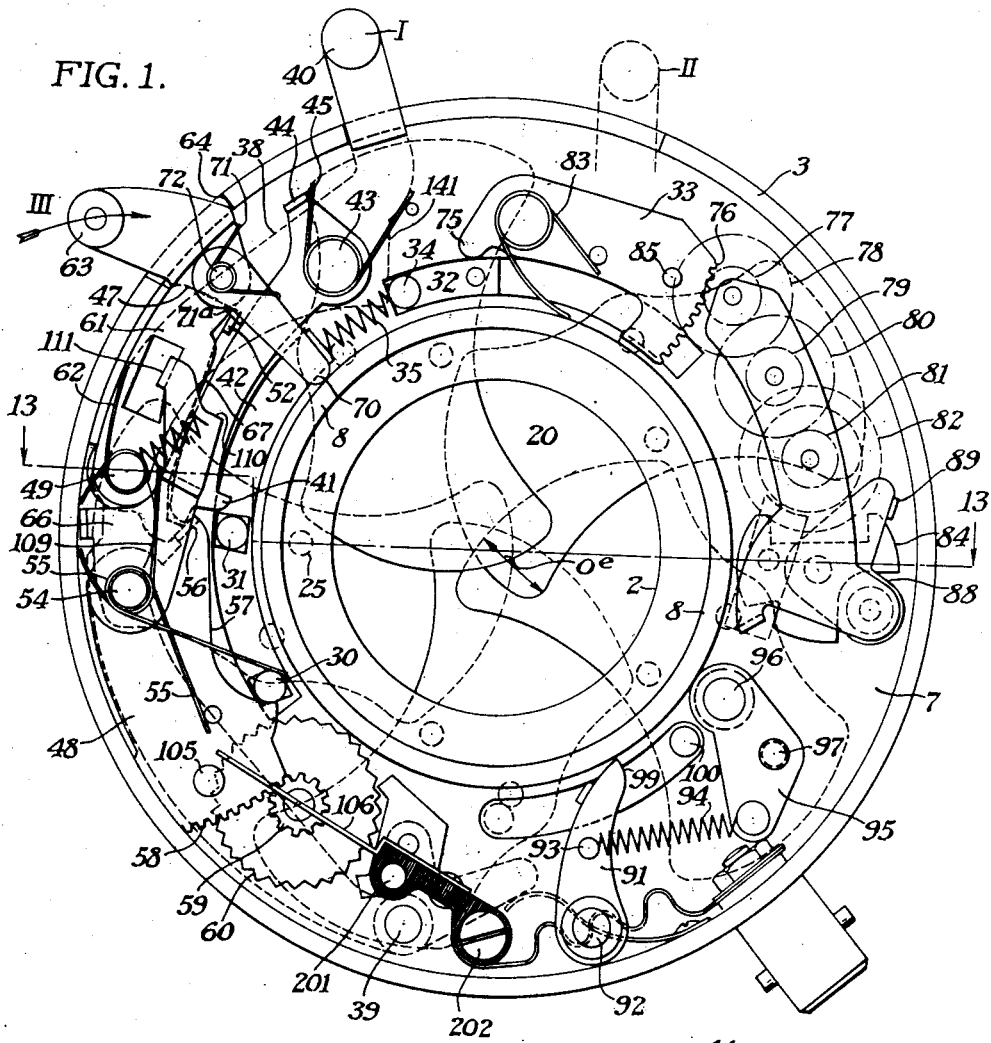
Fig. 1 is a top plan view of a shutter with parts including the cover removed and including mechanism construction in accordance with and embodying a preferred form of my invention. This illustrates the parts in the position they assume after an exposure has been completed.
Figure 2:
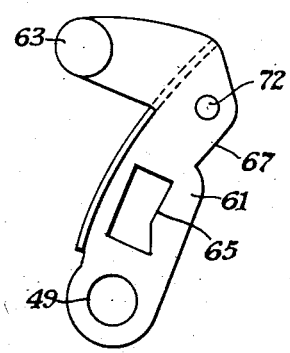
Fig. 2 is a top plan view of the shutter trigger removed from the shutter.

13—13 of Fig. 1 through the shutter with the cover plate and adjusting ring removed; the rear lens tube being partially broken away;

Fig. 14 is a top plan view of the shutter blade operating ring removed from the shutter;

Fig. 15 is a top plan view of the shutter-setting lever removed from the shutter;

Fig. 16 is a fragmentary detail top plan view showing the trigger and bulb lever construction, and Fig. 17 is a section taken on line 17—17 of Fig. 16.

My invention consists broadly in the provision of a shutter having blades moved in one direction at high speed for making an exposure, and including means for cushioning the shock otherwise occurring in bringing the rapidly moving blades to rest. This means is preferably included in a power-operated, shutter-tripping device which is automatically set thereby.

Figure 13:
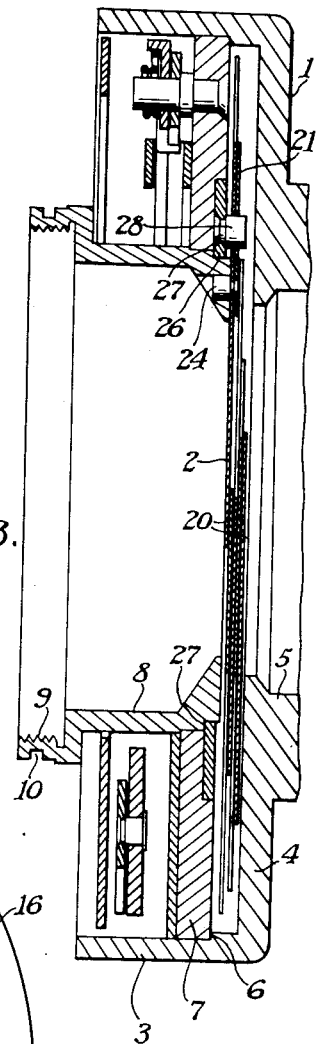
Fig. 13 is a transverse section taken on line

More specifically, the illustrated embodiment of my invention may consist of a shutter casing 1, shown in Fig. 13, having an exposure aperture 2 therein. A flange 3 extends upwardly from the bottom shutter wall 4. There is the usual rearwardly extending lens tube 5, and a flange 6 on which a mechanism plate 7 may rest; this plate including a forwardly extending annular portion 8 having interior threads 9 and a groove 10, all as shown in Figs. 1 and 13.

Figure 11:
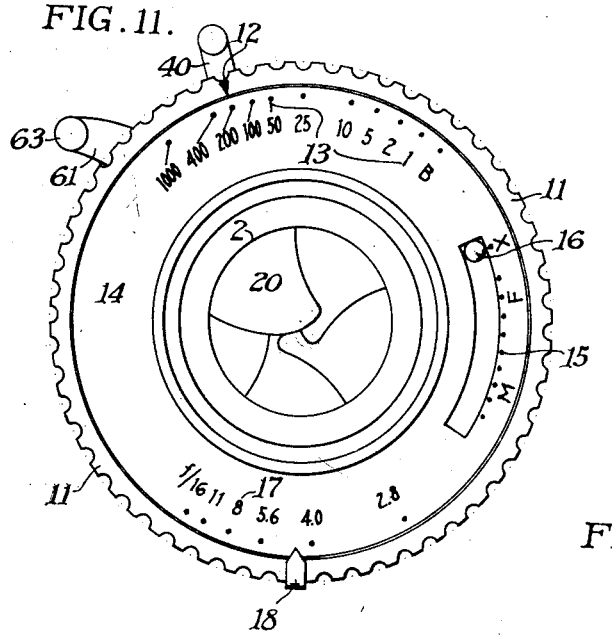
Fig. 11 shows the general appearance of the front of a shutter construction in accordance with my invention indicating the speed scale, the diaphragm scale and the synchronizing scale. In this view, the shutter cover plate is in place.

Fig. 11 shows a setting ring 11 which turns on flange 3 to set the shutter by moving pointer 12 over the speed scale 13 carried by the fixedly mounted shutter cover plate 14. This cover 14 may have a flash synchronizing scale 15 over which the knob 16 is adjustable, and a diaphragm scale 17 over which a diaphragm pointer 18 may move. As thus far described, the parts are not novel.

Figure 9:
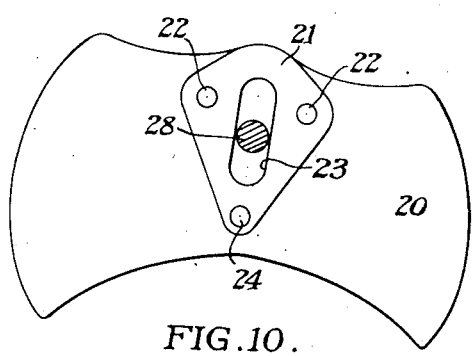
Fig. 9 is a top plan view of a shutter blade before being assembled in the camera, an operating pin being shown in operative relation to the blade.
Figure 10:
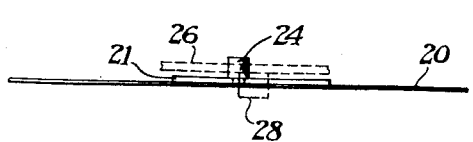
Fig. 10 is a front elevation of the shutter blade shown in Fig. 9.

Shutter blades 20, Figs. 1 and 9, are preferably made of thin steel stock of one to two-thousandths of an inch in thickness. Reinforcing slotted plates 21 may be attached as by rivets 22, a slot 23 extending through both the reinforcing plate and blade. The reinforcing plate and blade are provided with a pivot pin 24 which may engage a bearing 25 in the mechanism plate 7. A series of these blades, here shown as five, are mounted in the shutter to swing across the exposure aperture simultaneously to make an exposure, or for setting.

A blade ring 26, Fig. 13, is mounted to move in slot 27 of the mechanism plate 7 to move the shutter blades on their pivots 24 when pins 28 carried by the blade ring 26 are moved through the slots 23 in the blades. The blades 20 are designed to have an overlap, both in a closed position after an exposure has been made, and in a closed position before an exposure starts. These two overlaps are different, as shown in Figs. 1 and 5. Before an exposure and when the shutter is set, the overlap represented at "O", Fig. 5, is less than the overlap at the end of an exposure represented at "Oe", Fig. 1. The reason for the large overlap in the "Oe" position is that this overlap is used as a means for covering the exposure aperture while bringing the blades to rest. In other words, the rapid slowing up of the shutter blades is accomplished either totally or in a large part while the blades are closed and the relatively large overlap is occurring.

As shown in Fig. 14, the blade ring 26, in addition to the blade ring pins 28, carries a latching lug 30, a second lug 31 for releasing a trigger latch and for bulb exposures, and a block 32 for actuating and engaging a delayed speed segment 33, shown in Fig. 1. A pin 34 supports one end of a main drive spring 35, the other end 36 of which is attached to a fixed part of the shutter as, for instance, stud 49. In the present instance, the blade ring 26 may be set by a setting lever 38, shown in Fig. 15, pivoted at 39 to the casing or mechanism plate 7, and terminating in a handle 40. An abutment 141 on lever 38 may move pin 34 from the Fig. 1 to the Fig. 5 position when the handle 40 moves from its "I" to its "II" position.

The blade ring 26 may be held latched by a latch 41, Figs. 5, 6 and 7, engaging the latching lug 30. This lug may be engaged by latch element 41 carried by a lever pivoted at 43 and having an upstanding lug 44. A spring 45 turns lever 42 counterclockwise and into engagement with latching lug 30 on the blade ring. Lever 42 also includes a shoulder 46 normally limiting its counterclockwise movement through engagement with either a sub-trigger 47 or the power-operated release 48.

The sub-trigger 47 is pivoted on a stud 49 on which it may turn in a counterclockwise direction under the impulse of a spring 50. It carries a blocking arm 51, an upstanding lug 52, and is cut out at 53 for clearance. Its normal function is in part to prevent movement of the power-operated release 48, Fig. 1, which is a pivoted gear segment carried by a stud 54 and normally turned counterclockwise by a spring 55. When stop arm 56 lies against blocking arm 51, Fig. 6, it is held against movement, and with it latch lever 42 is held against movement. The power release 48 includes a cam 57, Figs. 1 and 5, and gear segment teeth 58 which may mesh with a gear 59, turning star-wheel 60, as shown, to regulate its speed of operation.

Figure 3:
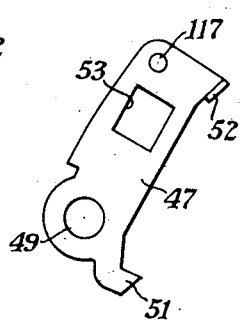
Fig. 3 is a top plan view of the sub-trigger removed from the shutter.
Figure 4:
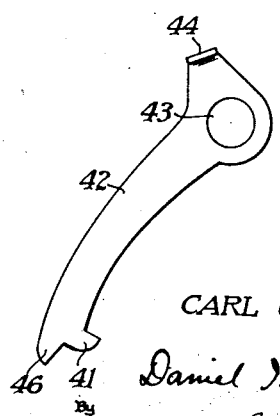
Fig. 4 is a similar view of a latch element used to hold the shutter parts in a set position.

The trigger, Fig. 16, is a lever 61 pivoted on the sub-trigger stud 49 and normally turned counterclockwise by a spring 62. A handle 63 extends out through a slot 64 in the shutter flange 3, and there is an aperture having an edge 65 for engaging a bulb lever 66, Fig. 16. The trigger also includes an edge 67 for engaging and moving the sub-trigger lug 52, Fig. 3. When the trigger is depressed, it moves the sub-trigger through edge 67 and lug 52, thereby causing the blocking arm 51 to move from the latch lever 42 and from the power-operated release 48 which must be unblocked before it can move. When unblocked by trigger 61 (which cannot, in itself, release latch lever 42), by moving clockwise, the power-operated release 48 is released and may be driven by its spring 55 which will drive it at a speed permitted by the gear retard 58, 59, 60, thus swinging the latch lever 42 until its hook, or latch, 41 releases the latching pin 30. The parts are about to be so released in Fig. 5 when the hook 41 of latch 42 is shown as barely engaging the latching pin 30. Obviously, slightly further movement will release pin 30 for exposure-making movement.

When release pin 30 and blade ring 26 move rapidly in a counterclockwise direction, pin 30 has a square cross section for engaging the latch 42 and a round cross section for engaging the cam 57 of the power-operated release 48. Before releasing, release 48 swings counterclockwise, and when releasing cam 57 is carried into the path of pin 30. Pin 30 therefore engages the cam and is gradually brought to rest by driving the release 48 back to its initial position of Fig. 1 against pressure of its spring 55. Most, or all, of this "slowing up" movement, due to cam 57 and pin 30, takes place after the closing overlap of the shutter blades 20 occurs, although it is sometimes advisable to start slowing up the blades after about the first two-thirds of movement of the blade ring 26. Thus, not only is the power-operated release 48 the means for finally releasing the shutter, it is also automatically set or returned to its initial position each time the shutter is actuated, and it brings the blades gradually to a rest position.

The trigger 61 is provided with a latch preventing operation of the trigger unless the shutter is first set. This latch, Figs. 1 and 5, consists of a finger 70 pivoted at 72 to the trigger and pressed by a spring 71 into a blocking position in which a lug 71a carried by the finger 70 lies against trigger 61. In the rest and unset position of Fig. 1, the trigger lying in position III, the finger 70 rests against the shutter flange or annular member 8 and prevents inward movement of the trigger. However, when the shutter is set, blade ring pin 31 moves the finger 70 to Fig. 5 position in which pressure on the trigger moves the finger about its pivot 72 so that the trigger may be operated.

The blade ring block 32 is for engaging and actuating the delay speed segment 33. This segment has a projection 75 engageable with the block 32 and includes teeth 76 meshing with a gear 77 of the gear train 78, 79, 80, 81. A starwheel 82 is usually provided with which a pallet 84 may mesh. Segment 33 is moved by a spring 83 to engage projection 75 and block 32 but may be held away from it by a pin 85 which may be located by cam 86 of the setting ring 11, best shown in Fig. 8.

Pallet 84 may be moved on its mount 88 by a finger 89 engaging cam 90 of setting ring 87. Thus, the range of fast and slow exposures are all determined by the position of the retard and pallet except for the highest speed of 1/1000 second for which exposure additional spring tension is desired. This added pressure may be an arm 91, Fig. 1, pivoted at 92 to the shutter and carrying a pin 93 to which one end of a spring 94 is attached. The other end of spring 94 is attached to lever 95 pivoted at 96 to casing and having a pin 97 engageable with cam 98 of the speed setting ring 11. When lever 95 is moved counterclockwise, spring 94 is tensioned. Since arm 91 includes a cam 99 lying in the path of blade ring pin 100, each time the shutter is set and is adjusted for its highest speed, this spring is tensioned to impart an additional starting torque to the blade ring. This supplementary spring 94 is used only for the fastest exposures.

Figure 12:
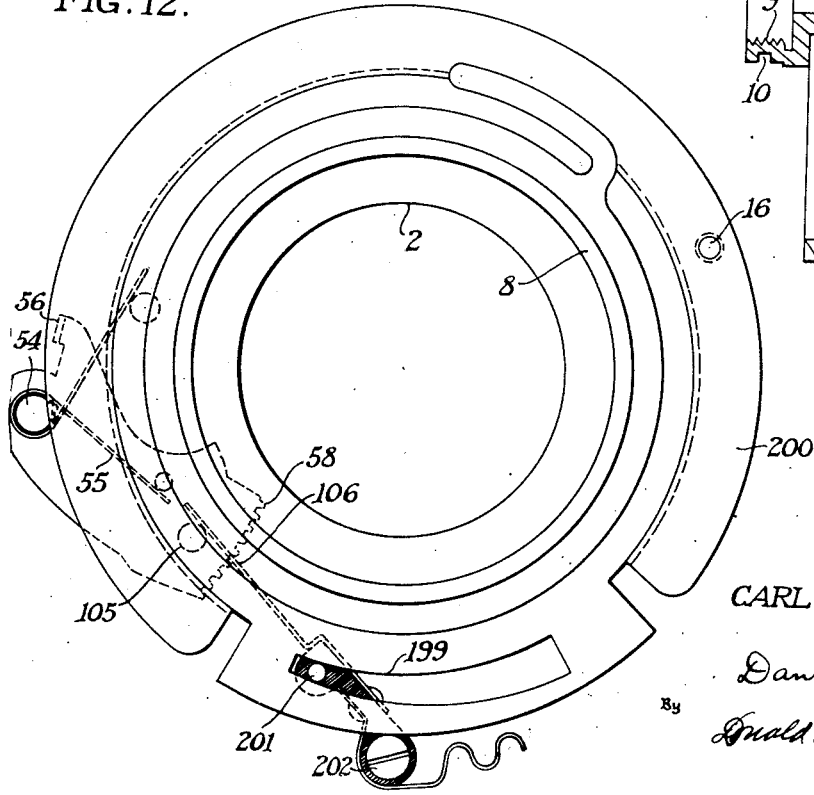
Fig. 12 is a top plan view of an adjusting ring showing the relation of the power-operated release to the synchronizing switch and the means for varying contact between the switch elements.

The power release 48 has an additional use in that it provides an accurate way of synchronizing a flashlight with movement of shutter blades. Because the operation of the trigger does not affect the speed of movement of release 48 relative to the shutter blades, a contact pin 105 carried by release 48 may make contact with a spring switch element 106 at a time definitely related to the shutter blade movement. By adjusting terminal 106, Fig. 12, by means of cam 199 on the adjusting ring 200, pin 201 carried by the switch contact is moved about pivot 202. A spring 203 tends to turn the contact in the direction shown by the arrow, Fig. 12. The adjusting ring 200 may be turned by knob 16 shown in Fig. 11. Thus, the desired milli-second delay can be obtained and the shutter can be synchronized for all speeds and lamps. Since the synchronizer forms no part of the present application, no further description is necessary.

The shutter trigger 61 is provided with an edge 65 for engaging a "bulb" lever 66. This "bulb" lever, Fig. 16, is pivoted on stud 54 and is pressed by a spring 109 into its operative position with respect to trigger 61, as shown in Fig. 16. In this position, a shoulder 110 lies in the path of pin 34 on the blade ring when the trigger is moved to make an exposure. Also, in this position, an ear 111 extends into the trigger slot to engage the edge 65 which may be of any convenient shape, since its function is to permit the bulb lever 66 to move with the trigger and into a position to engage pin 34. However, this movement can only take place when an aperture 112 lies in position for lug 113 to move. At all other settings of the setting ring 11 this lug 112 lies in a groove 114 conveniently formed all around the setting ring 11 so that the clearance hole in the trigger 61 permits movement of the trigger while the "bulb" lever is so held out of the path of blade ring pin 34.

Figure 8:
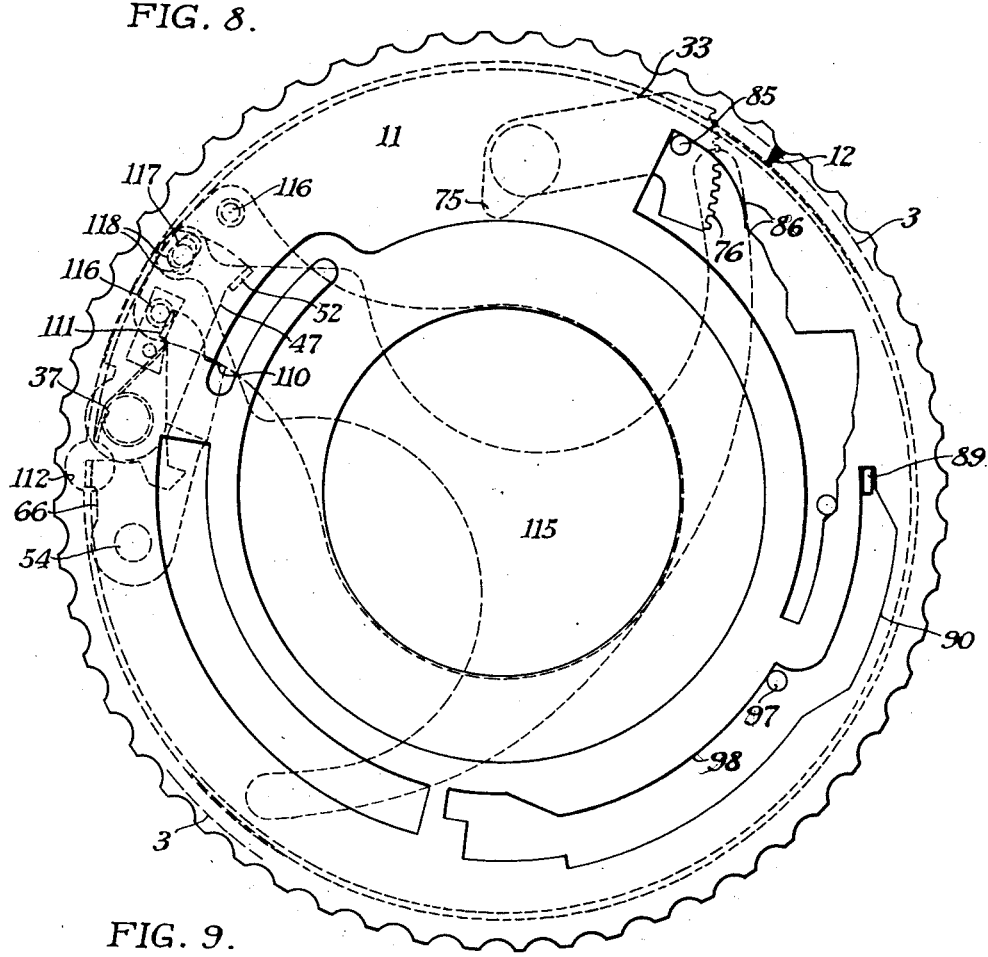
Fig. 8 is a fragmentary top plan view showing the various cam controls for the shutter mechanism, the supplemental cover blades and their connection with the sub-trigger by which they are operated.

Since the shutter blades 20 open and close in setting, a means controlled by the trigger controls the cover blades preventing light from entering during setting and allowing light to enter for exposures. The cover blades 115 are shown in Fig. 8. Here, two are shown and they are generally "sickle shaped," right and left-hand. Each blade is pivotally mounted on a stud 116 and a pin 117 on the sub-trigger 47 passes through slots 118, one in each blade. Therefore, as the sub-trigger 47 moves, these cover blades 115 move, and they are fully open when the sub-trigger has moved a distance sufficient to release the blade ring latching pin 30 and therefore an exposure may be made. Of course, the cover blades 115 remain closed in setting, since the trigger is latched against movement.

The operation of the shutter is extremely simple. With the parts in the Fig. 1 position an exposure has just been made. The trigger 61 is latched because finger 70 rests against the annular flange 8 and consequently the trigger 61 cannot be moved. The shutter must next be set. This is done by moving the setting lever 38 by handle 40 from position I to II, thereby moving the blade ring through pin 31 to a position in which latch 42 engages pin 30. The setting lever immediately returns to position "I" while the blade ring remains latched in its set position with spring 35 tensioned.

Any speed may be selected by turning the setting ring 11 until the pointer 12 indicates the selected speeds on scale 13. Such movement causes the proper cam 86 or 90 to be brought into position to adjust the delay mechanism, including segment 33, for retard, and the pallet 84 for additional retard, if either or both are required for the selected speed. If the fastest exposure is selected, spring 94 will be added to give the additional starting torque when its support is turned on its pivot 189 by cam 90 and lug 89. Thus, spring 94 will be rendered effective.

Any diaphragm opening may be selected by adjusting pointer 18 over scale 17. Since this structure is standard, it is not otherwise shown or described except that it may be of the general type shown in U. S. Pat. No. 1,422,461, Marks, July 11, 1922.

An exposure may be made by depressing trigger handle 63, causing the trigger 61 to move sub-trigger 47 to such an extent that the power-driven release 48 may move release lever 42 until latch element 41 releases the blade ring pin 30. An exposure is then made. Since, at the moment of release, member 48 does the releasing, shake, resulting from too hard pressure on the trigger, is not possible. Power-driven release 48 also standardizes the synchronizing as the shutter blades 30 must always move a definite millisecond interval after release 48 works.

From the above application and the appended claims, it will be seen that I have provided a shutter mechanism in which the several objects of my invention are achieved and which is well adapted to meet conditions of actual use.

As various possible embodiments may readily be devised, and as various changes may be made from the embodiment set forth as a preferred example, it is to be understood that all matter herein set forth or shown in the accompanying drawings is to be interpreted as illustrative only and not in a limiting sense.

Having thus described my invention, what I claim as new and desire to secure by Letters Patent of the United States is:

1. A shutter for cameras of the type including a shutter casing and mechanism plate mounted thereon forming a part thereof, an exposure aperture in the casing, a plurality of pivotally mounted shutter blades to open and close the aperture, a blade ring mounted on the casing and operably connected with the blades, a pin carried by the blade ring, a power spring connected to the blade ring and the shutter casing, the combination with the blade ring of a first latch element thereon, a second latch element pivoted on the camera casing and positioned to engage the first latch element on the blade ring when the latter is in a set position, means for moving the blade ring to a set position where it may be held by the inter-engaging first and second latch elements, a power-operated shutter release mechanism including a pivoted lever, a spring tending to turn the pivoted lever in one direction, a flange on the pivoted lever having a rest position with the flange resting against the second latch element, said spring tending to turn the pivoted lever in a direction to release the second latch element from the first latch element, said lever also carrying a cam, the flange on the pivoted lever having a rest position with the flange resting against the second latch element and normally holding the second latch element against movement and in a first latch element engaging position, the portion carrying the cam normally lying to one side of the path of movement of the pin on the blade ring, the lever being movable in a direction in which the flanged end may release the second latch element, this movement simultaneously moving the cam from a rest position adjacent the path of the blade ring pin to an operative position lying across that part of the path of the blade ring pin through which the pin passes after the blade ring moves in opening and at least partially closing the blades, whereby the cam may apply a braking action to the blade ring pin, a trigger mechanism including a manually operable member and an abutment under the control of the manually-operable member, the abutment normally engaging and holding the power-operated shutter release against movement, except when the abutment may be moved by the manually-operable member away from its power-operated shutter release holding position.

2. A shutter for cameras of the type including a shutter casing and mechanism plate mounted thereon and forming a part thereof, an exposure aperture in the casing, a plurality of pivotally mounted shutter blades to open and close the aperture, a blade ring movably mounted on the casing and operably connected with the blades, a pin carried by the blade ring, a power spring connected to the blade ring and shutter casing, the combination with the blade ring, of a first latch element thereon, a second latch element pivoted on the camera casing and positioned to engage the first latch element on the blade ring when the latter is in a set position, means for moving the blade ring to a set position where it may be held by the inter-engaging first and second latch elements, a power-operated shutter release mechanism including a pivoted lever, a spring tending to turn the pivoted lever in one direction, a flange on the pivoted lever having a rest position with the flange resting against the second latch element, said spring tending to turn the pivoted lever in a direction to release the second latch element from the first latch element, said lever also carrying a cam, the cam normally lying to one side of the path of movement of the pin on the blade ring, the lever being movable in a direction in which the flange may move the second latch element to release the first latch element, the pin and blade ring having a path of movement of a length to open and close the shutter blades while moving in one direction, the movement of the lever moving the second latch element and also moving the cam from a rest position adjacent the path of the blade ring pin to a position across the path of approximately the last quarter of the total path of movement traveled by the pin, whereby the pin may be gradually decelerated, and a trigger mechanism including a manually-operable member and an abutment under the control of the manually-operable member, the abutment normally engaging and holding the power-operated shutter release against movement, except when the abutment may be moved by the manually-operable member away from its power-operated shutter release holding position.

3. A shutter for cameras of the type including a shutter casing and mechanism plate fixedly mounted therein and forming a part thereof, an exposure aperture therein, a plurality of pivotally mounted shutter blades to open and close the aperture, a blade ring movably mounted on the shutter casing and operably connected to the blades, a pin carried by the blade ring, a power spring connected to the shutter casing and to the blade ring for driving the latter to operate the blades, the combination with the blade ring, of a first latch element on the blade ring, a second latch element pivoted to the shutter casing and positioned to engage the first latch element on the blade ring when the latter is in a set position, means for moving the blade ring to a set position where it may be held by the inter-engaging first and second latch elements, a power-operated shutter release including a pivotally mounted lever carrying a cam, a spring means tending to turn the power-operated release in a direction to move the cam into the path of the pin carried by the blade ring, the cam bing so shaped that it may lie in the path of the pin at that portion of the movement of the pin to which the blade ring has moved the blades through an open position to at least a partially closed position, a flange on the pivotally mounted lever having a rest position with the flange resting against the second latch element, said spring in moving the cam into the path of the pin also moving the second latch element from the first latch element, a trigger movably mounted in the shutter casing, a subtrigger movably mounted in the shutter casing, an abutment on the subtrigger a flange on the subtrigger adjacent the rigger, said flange being positioned to coact with the trigger, the flange on the subtrigger lying in the path of movement of the trigger to be engaged and moved thereby, the subtrigger being mounted for movement into and out of contact with the flange on the pivotally mounted lever to hold and release the flange and permit the spring means to turn the pivotally mounted lever and its cam, releasing the interengaging first and second latch elements on the blade ring and shutter casing, whereby as the pivoted lever moves in releasing the first and second latch elements the cam may be moved into the path of the pin carried by the blade ring to slow up movement thereof as the blade ring moves toward a rest position.

4. A camera shutter of the type defined in claim 3 characterized in that the trigger and the subtrigger are coaxially pivoted in the shutter casing and in that there is a spring tending to hold the subtrigger flange in contact with the trigger.

5. A camera shutter of the type defined in claim 3 characterized in that the spring means of the power-operated release is of insufficient power to overcome the power of the blade ring spring whereby the blade ring pin may strike the power-operated release cam and drive said power-operated release lever in a direction away from the blade ring, thereby moving the second latch member toward the first latch member latching position.

6. A camera shutter of the type defined in claim 3 characterized in that the cam surface carried by the pivotally mounted power-operated shutter release includes a curved surface adapted to coact with the blade ring pin which may swing across the path of movement of the blade ring pin to be engaged by said blade ring pin when the blade ring spring moves the blade ring past a position in which the blades have been fully opened and to a position in which the blades have started their closing movement, at which time the cam may cushion the closing movement of the shutter blades.

7. A shutter for cameras of the type including a shutter casing including a mechanism plate fixedly mounted therein, an exposure aperture therein, a plurality of movably mounted shutter blades movable to open and close the aperture, a blade ring movably mounted on the shutter casing and operably connected to the blades, a power spring connected to the shutter casing and to the blade ring for moving the latter in one direction to operate the shutter blades, the combination with the blade ring, of a first latch element on the blade ring, a second latch element carried by the shutter casing and positioned to engage the first latch element on the blade ring when the latter is in a set position, means for moving the blade ring to a set position, where it may be held by the interengaging first and second latch elements, a power-operated shutter release including a pivoted lever, a spring tending to turn the pivoted lever in one direction, a flange on the pivoted lever having a rest position with the flange resting against the second latch element, said spring tending to turn the pivoted lever in a direction to release the second latch element from the first latch element, a subtrigger pivotally mounted on the shutter casing and including an abutment normally resting against the flange of the power-operated release to block movement thereof under the action of its spring and thereby prevent release of the shutter, and a trigger movably mounted on the shutter casing and being positioned when moved to engage and move the subtrigger to remove the abutment from the flange whereby the power-operated shutter release may move the second latch element to release the first latch element to make an exposure, the pivoted lever of the power-operated release carrying a cam surface, a pin on the blade ring, the cam surface swinging across the path of the pin on the blade ring as the second latch is released from the first latch, the blade ring pin and cam being so positioned that the cam may be struck by the pin as the blade ring moves in closing the shutter blades, the blade ring pin striking the cam and swinging the lever in a reverse direction as the shock of the blade ring is absorbed by the pin acting on the cam, and the lever of the power-operated shutter release being returned by said reverse direction swinging to a position in which the flange may again rest against the abutment of the subtrigger.

8. The shutter for cameras defined in claim 7 characterized in that there is a speed control mechanism included in the power-operated shutter release mechanism by which the pivoted lever may always move at a fixed rate of speed under the influence of its spring in one direction for releasing the second latch element from the first latch element, and may offer uniform resistance in absorbing the shock of the shutter blades being brought to rest.

9. The shutter for cameras defined in claim 7 characterized in that there is a speed control mechanism included in the power-operated shutter release mechanism by which the pivoted lever may always move at a fixed rate of speed under the influence of its spring in one direction for releasing the second latch element from the first latch element, and may offer uniform resistance in absorbing the shock of the shutter blades being brought to rest and characterized in that the speed control mechanism may be moved in a reverse direction to restore the power-operated release to its rest position by the blade ring.

10. A shutter for cameras of the type including a shutter casing and mechanism plate fixedly mounted therein and forming a part thereof, an exposure aperture therein, a plurality of pivotally mounted shutter blades to open and close the aperture, a blade ring movably mounted on the shutter casing and operably connected to the blades, a pin carried by the blade ring, a power spring connected to the shutter casing and to the blade ring for driving the latter to operate the blades, the combination with the blade ring, of a first latch element on the blade ring, a second latch element pivoted to the shutter casing and positioned to engage the first latch element on the blade ring when the latter is in a set position, means for moving the blade ring to engage the first latch element with the second latch element to hold the power spring and blade ring in a set position ready for an exposure, a power-operated shutter release mechanism including a pivotally mounted lever carrying a cam and a flange, a spring acting on the lever tending to turn it in one direction, the flange on the lever being movable as the pivoted lever moves on its pivot to position the flange in a rest position with the flange resting against the second latch element, and when moved on its pivot, to move the flange from its rest position resting against the second latch element and to simultaneously move the cam across the path of the pin on the blade ring, said pin and cam being relatively positioned to engage when an exposure is made and after approximately three-quarters of the total travel of the blade ring from a set to a rest position has taken place and at the end of an exposure, whereby the blade closing movement of the blade ring is decelerated, and trigger mechanism including a manually operable handle and including means adapted to lie in the path of movement of and block movement of the power-operated release, said means being removable from said path of movement of the power-operated release when said operable handle of the trigger mechanism is released.

11. A shutter for cameras of the type defined in claim 10 characterized in that the power-operated release may be moved from a rest position to a second latch-releasing position and back to its rest position at each exposure, the spring turning the lever in one direction to release the shutter and the pin on the blade ring driving the lever against the pressure of the spring back to its initial rest position.

CARL C. FUERST.

References Cited in the file of this patent

UNITED STATES PATENTS

| Number | Name | Date |
| --- | --- | --- |
| 946,679 | Marks | Jan. 18, 1910 |